(12) United States Patent
Cho et al.

(10) Patent No.: US 9,617,182 B2
(45) Date of Patent: Apr. 11, 2017

(54) LOW-TRANSMISSION DARK MIST GREEN GLASS COMPOSITION

(71) Applicant: KCC CORPORATION, Seoul (KR)

(72) Inventors: Youn Min Cho, Gyeonggi-do (KR); Yong Yi Kim, Gyeonggi-do (KR); Jin Yong Kim, Gyeonggi-do (KR); Jae Chung Lim, Gyeonggi-do (KR)

(73) Assignee: KKC Corporation, Seoul (KR)

( * ) Notice: Subject to any disclaimer, the term of this patent is extended or adjusted under 35 U.S.C. 154(b) by 0 days.

(21) Appl. No.: 14/759,587

(22) PCT Filed: Jan. 7, 2014

(86) PCT No.: PCT/KR2014/000128
§ 371 (c)(1),
(2) Date: Jul. 7, 2015

(87) PCT Pub. No.: WO2014/107082
PCT Pub. Date: Jul. 10, 2014

(65) Prior Publication Data
US 2015/0344354 A1   Dec. 3, 2015

(30) Foreign Application Priority Data
Jan. 7, 2013 (KR) .................. 10-2013-0001645

(51) Int. Cl.
*C03C 3/087* (2006.01)
*C03C 4/02* (2006.01)
*C03C 4/08* (2006.01)
*C03C 3/095* (2006.01)

(52) U.S. Cl.
CPC .............. *C03C 4/085* (2013.01); *C03C 3/087* (2013.01); *C03C 3/095* (2013.01); *C03C 4/02* (2013.01); *C03C 4/082* (2013.01)

(58) Field of Classification Search
CPC .................................. C03C 3/087; C03C 4/02
See application file for complete search history.

(56) References Cited

U.S. PATENT DOCUMENTS

| | | | |
|---|---|---|---|
| 4,104,076 A * | 8/1978 | Pons | C03C 1/10 501/66 |
| 4,873,206 A | 10/1989 | Jones | |
| 5,352,640 A * | 10/1994 | Combes | C03C 3/078 501/71 |
| 5,545,596 A * | 8/1996 | Alvarez Casariego | C03C 3/087 501/70 |
| 5,905,047 A * | 5/1999 | Sasage | C03C 3/087 501/71 |
| 5,932,502 A * | 8/1999 | Longobardo | C03C 3/087 501/70 |
| 6,071,840 A * | 6/2000 | Sasage | C03C 1/10 501/71 |
| 6,080,695 A * | 6/2000 | Scheffler-Hudlet | C03C 3/087 501/70 |
| 6,413,893 B1 * | 7/2002 | Shelestak | C03C 3/087 501/70 |
| 6,673,730 B1 * | 1/2004 | Shelestak | C03C 3/087 501/70 |
| 2004/0038799 A1* | 2/2004 | Landa | C03C 1/00 501/70 |
| 2004/0168474 A1* | 9/2004 | Jeanvoine | C03B 5/173 65/121 |
| 2007/0191205 A1* | 8/2007 | Delmotte | C03C 4/02 501/55 |
| 2013/0105722 A1* | 5/2013 | Tsuzuki | C03C 3/087 252/62 |

FOREIGN PATENT DOCUMENTS

| | | | |
|---|---|---|---|
| JP | 110114539 A | 5/1998 | |
| JP | 3264841 B2 | 3/2002 | |
| JP | 2005533740 A | 11/2005 | |
| JP | 2007529400 A | 10/2007 | |
| JP | WO 2011152257 A1 * | 12/2011 | ............ C03C 3/087 |
| KR | 10-0353102 B1 | 3/2003 | |
| KR | 10-2010-0096541 A | 9/2010 | |
| KR | 101062878 B1 | 9/2011 | |

OTHER PUBLICATIONS

PCT/KR2014/000128 English Translation of International Search Report mailed Mar. 27, 2014, 3 pages.

* cited by examiner

*Primary Examiner* — Elizabeth A Bolden
(74) *Attorney, Agent, or Firm* — Fennemore Craig, P.C.

(57) ABSTRACT

The present invention relates to a low-transmission dark mist green glass composition, more specifically relates to a low-transmission dark mist green glass composition in which $Fe_2O_3$, CoO, Se and $Cr_2O_3$ are used as coloring components within a specific content range where for the coloring components the relative contents of $(CoO+Cr_2O_3)$ to Se and CoO to $Cr_2O_3$ are restricted to certain ranges and accordingly the visible transmittance ($LT_A$) is effectively controlled and thus a blocking performance for privacy is satisfied; the solar energy transmittance ($T_e$) and the UV transmittance ($T_{uv}$) are lowered, and accordingly the cooling load for vehicles, buildings and the like is reduced and interior materials and people protection against UV rays is obtained; and the optimal range of chromaticity diagram of transparent colors is satisfied which accordingly reduces eyestrain and provides psychological stability.

8 Claims, No Drawings

LOW-TRANSMISSION DARK MIST GREEN GLASS COMPOSITION

TECHNICAL FIELD

The present invention relates to a dark, green-gray colored, low-transmittance glass composition. More specifically, the present invention relates to a dark, green-gray colored, low-transmittance glass composition, wherein $Fe_2O_3$, CoO, Se and $Cr_2O_3$ are used as colorant ingredients in specific content ranges, and the relative amounts of $(CoO+Cr_2O_3)$ to Se and CoO to $Cr_2O_3$ in the above colorant ingredients are restricted within specific ranges, thereby visible light transmittance ($LT_A$) can be effectively controlled so as to give privacy protection, solar energy transmittance ($T_e$) and ultraviolet rays transmittance ($T_{uv}$) can be lowered so as to reduce cooling load in motor vehicles, buildings, etc. and protect interior material and people from ultraviolet rays, and the optimal range of color space coordinate of transparent color can be satisfied so as to relieve eye strain and provide psychological stability.

BACKGROUND ART

Although the use of colored glass is not especially limited, it can be applied for privacy glass or the sun roof of car safety glass and building glass, etc. As compared with general soda-lime glass, colored glass can lower visibility in motor vehicles because of its low visible light transmittance ($LT_A$) and can reduce heat absorption into motor vehicles because of its low solar energy transmittance ($T_e$). In addition, since it has low ultraviolet rays transmittance ($T_{uv}$), damage to fabrics and discoloration or decomposition of articles inside motor vehicles due to ultraviolet rays can be prevented.

Various elements can be incorporated into colored glass in order to improve the glass color, UV-blocking effect, and solar energy absorption effect. The representative elements used in colored glass include iron (Fe), cobalt (Co) and selenium (Se), and chromium (Cr), manganese (Mn), titanium (Ti), cerium (Ce), nickel (Ni), copper (Cu), etc. may be further used. Each of these elements has a unique coloring effect, and the absorption characteristics of ultraviolet rays and solar energy. Such characteristics result from the phenomenon that each element absorbs its specific wavelength. Accordingly, the desired color and transmittance may be designed through the combination of added elements in appropriate ratios.

By properly adjusting various elements as explained above, it is possible to prepare a dark, green-gray colored glass composition. Specifically, a glass having high absorbance property of visible light, ultraviolet rays and solar energy (i.e., low transmittance property) can be prepared. Such a low-transmittance glass composition can be divided into two groups, in which one group is prepared by using Fe, Co and Se as basic elements for coloring while the other group further uses additional elements.

U.S. Pat. No. 4,873,206 discloses a glass composition comprising 0.6 to 1.0% by weight of total $Fe_2O_3$, 0.005 to 0.02% by weight of Se and 0.01 to 0.02% by weight of CoO, and not containing Ni and Cr. However, this composition has a visible light transmittance ($LT_A$) of about 25 to 30% as measured for a reference thickness of 4 mm and thus is not suitable for providing the function of privacy protection which is an important function of a low-transmittance glass composition applied for sunroof or rear privacy glass. In addition, there is a limitation in preparing a dark, green-gray colored glass composition.

DISCLOSURE OF INVENTION

Technical Problem

To resolve the problems of prior arts as explained above, the technical problem of the present invention is the provision of a dark, green-gray colored, low-transmittance glass composition in which visible light transmittance ($LT_A$) is effectively controlled so as to give privacy protection, solar energy transmittance ($T_e$) and ultraviolet rays transmittance ($T_{uv}$) is lowered so as to reduce cooling load in motor vehicles, buildings, etc. and protect interior material and people from ultraviolet rays, and the optimal range of color space coordinate of transparent color is satisfied so as to relieve eye strain and provide psychological stability, and a glass formed therefrom.

Solution to Problem

To solve the above technical problem, the present invention provides a dark, green-gray colored, low-transmittance glass composition which comprises: as colorant ingredients, 1.2 to 2 parts by weight of total $Fe_2O_3$, 0.02 to 0.04 parts by weight of CoO, 0.002 to 0.0035 parts by weight of Se and 0.01 to 0.04 parts by weight of $Cr_2O_3$, based on 100 parts by weight of a base glass composition, wherein the weight ratio of $(CoO+Cr_2O_3)$ to Se $(=[CoO+Cr_2O_3]/Se)$ is 13 to 25, and the weight ratio of CoO to $Cr_2O_3$ $(=CoO/Cr_2O_3)$ is 0.9 to 1.8.

A dark, green-gray colored, low-transmittance glass composition according to one preferred embodiment of the present invention represents 15% or less of visible light transmittance ($LT_A$), 16% or less of solar energy transmittance ($T_e$) and 5% or less of ultraviolet rays transmittance ($T_{uv}$) as measured for a reference thickness of 4 mm.

In addition, a dark, green-gray colored, low-transmittance glass composition according to one preferred embodiment of the present invention has the range of 35 to 50 of L*, −5 to 0 of a* and 0 to 6 of b* at color space coordinate of transparent color (light source D65, 10 degree angle of view).

Advantageous Effects of Invention

The dark, green-gray colored, low-transmittance glass composition according to the present invention shows excellent absorption of visible light, solar energy and ultraviolet rays, and thus it can effectively perform the functions of privacy protection, cooling load reduction and UV blocking in cars and buildings, etc., and also can relieve eye strain and provide psychological stability by satisfying the optimal range of color space coordinate of transparent color.

MODE FOR THE INVENTION

The present invention is described in detail hereinafter.

Base Glass

For the base glass, any base glasses comprising the conventional ingredients and amounts can be employed and used with no special limitation. In a preferred embodiment, a base glass composition comprising the ingredients and amounts (based on total 100% by weight of base glass composition) shown in the following Table 1 can be used.

TABLE 1

| Ingredients | Amounts (% by weight) |
|---|---|
| $SiO_2$ | 65 to 75 |
| $Al_2O_3$ | 0.3 to 3 |
| $Na_2O + K_2O$ | 10 to 18 |
| CaO | 5 to 15 |
| MgO | 1 to 7 |

Among the above ingredients, $SiO_2$ performs a function of forming a network structure which is a basic structure of glass. If its amount is less than 65% by weight, there may be a problem in the durability of glass. If its amount is greater than 75% by weight, the high-temperature viscosity may increase and the meltability may be lowered.

$Al_2O_3$ increases the high-temperature viscosity of glass and when a small amount is added, it improves the durability of glass. If its amount is less than 0.3% by weight, the chemical resistance and water resistance may become poor. If its amount is greater than 3% by weight, the melt load may increase together with the increase of high-temperature viscosity.

$Na_2O$ and $K_2O$ are flux agents promoting the melting of raw materials for glass. If the sum of their amounts is less than 10% by weight, the melting quality may be lowered due to the increase of non-molten substances. If the sum of their amounts is greater than 18% by weight, the chemical resistance may be lowered.

CaO and MgO are ingredients that facilitate the melting of raw materials and strengthen the weatherability of glass structures. If the amount of CaO is less than 5% by weight, the durability may be lowered. If the amount of CaO is greater than 15% by weight, due to the increase of crystallization tendency there may be an adverse effect on product quality. If the amount of MgO is less than 1% by weight, the above-explained melting-facilitating and weatherability-strengthening effects may be reduced. If the amount of MgO is greater than 7% by weight, the increase of crystallization tendency may cause crystal defects.

In a practical production, sodium sulfate ($Na_2SO_4$) may be additionally used to improve melting quality such as the removal of bubbles. In this case, however, the amount existing in glass as in $SO_3$ form is preferably controlled in the range of 0.01 to 1% by weight during the melting procedure.

Iron (Total $Fe_2O_3$)

Iron (Fe) may be contained in main/additional raw materials as an impurity, and in conventional commercial productions it may exist in the glass in an amount of 0.1 to 0.2% by weight even without being incorporated separately. In most colored glasses, iron is further incorporated to adjust the transmittance and color as desired. As the incorporated raw material, ferric oxide ($Fe_2O_3$) is used. The ferric oxide incorporated during the glass-melting procedure may exist as $Fe^{3+}$ and $Fe^{2+}$. $Fe^{3+}$ ion shows weak absorption in the visible light region of 410 to 440 nm and strong absorption in the ultraviolet region with a center at 380 nm. By these characteristics, if $Fe^{3+}$ exists in a large amount, the glass becomes pale yellow. Meanwhile, since $Fe^{2+}$ ion shows strong absorption edge with a center at 1,050 nm, it is known to be absorbing infrared rays. As the amount of $Fe^{2+}$ increases, the glass color changes to blue. The ratio between $Fe^{2+}$ and $Fe^{3+}$ in total $Fe_2O_3$ may vary according to the production process of glass.

The glass composition of the present invention comprises total $Fe_2O_3$ in an amount of 1.2 to 2 parts by weight based on 100 parts by weight of the base glass composition. Specifically, the amount of total $Fe_2O_3$ may be, for example, 1.2, 1.3, 1.4, 1.5 or 1.6 or more parts by weight, or 2, 1.9, 1.8 or 1.7 or less parts by weight.

If the amount of total $Fe_2O_3$ is less than 1.2 parts by weight, based on 100 parts by weight of the base glass composition, the visible light transmittance ($LT_A$) increases, resulting in a reduction in the functions of privacy protection and solar energy blocking which are some of the most important characteristics of a low-transmittance glass composition. If the amount is greater than 2 parts by weight, based on 100 parts by weight of the base glass composition, the color purity increases and the visible light transmittance ($LT_A$) drastically decreases, which lowers the visibility and renders it unsuitable for windows of motor vehicles and buildings, and the content of $Fe^{2+}$ absorbing radiant infrared rays inevitably increases and the temperature in the bottom part of the melting furnace becomes lower during the melting procedure, causing the problem of melting load increase. The amount of the total $Fe_2O_3$ is more preferably 1.2 to 1.8 parts by weight, and still more preferably 1.3 to 1.5 parts by weight, based on 100 parts by weight of the base glass composition in order to reduce melting load and prepare a composition in which visible light transmittance ($LT_A$) is proper for privacy protection.

In the glass composition of the present invention, the content of FeO is preferably 10 to 30% of the content of the total $Fe_2O_3$ (i.e., Redox=FeO/total $Fe_2O_3$ is 0.1 to 0.3). If the FeO content is less than 10% of the total $Fe_2O_3$ content, solar energy transmittance ($T_e$) increases and the probability that Se exists in the form of $SeO_2$ rather than Fe—Se increases so that Se coloration may be lowered. If the FeO content is greater than 30% of the total $Fe_2O_3$ content, the volatized amount of Se increases and thus an appropriate amount of Se may not be maintained in the glass, and according to the increase of $Fe^{2+}$, problems of heat conductivity decrease, temperature decrease in the bottom part during the melting procedure and melting quality degradation during the melting procedure may be caused. The FeO content is more preferably 15 to 30% of the total $Fe_2O_3$ content, and still more preferably 20 to 30% in order to be suitable for Se coloration and to decrease the problem of heat conductivity.

Cobalt (CoO)

Cobalt (Co) is fed to a batch in the form of cobalt oxide. When existing in $Co^{2+}$ form, it shows absorption edge at around 530, 590 and 645 nm. By the effect of such absorption, cobalt makes the glass a strong blue color.

The glass composition of the present invention comprises CoO in an amount of 0.02 to 0.04 part by weight (i.e., 200 to 400 ppm), based on 100 parts by weight of the base glass composition. Specifically, the amount of CoO may be, for example, 0.021, 0.022, 0.023, 0.024 or 0.025 or more part by weight, or 0.03, 0.029, 0.028 or 0.027 or less part by weight.

If the amount of CoO is less than 0.02 part by weight, based on 100 parts by weight of the base glass composition, the visible light transmittance ($LT_A$) increases, resulting in a reduction in the function of privacy protection which is an important function of low-transmittance glass composition, and the pink color of Se and the red-brown color of Fe—Se (poly-iron selenide) are insufficiently decolorized. If the amount of CoO is greater than 0.04 part by weight, based on 100 parts by weight of the base glass composition, the glass composition becomes too blue, and in order to change it to dark, green-gray color it is necessary to increase the amounts of Se and $Cr_2O_3$, and in this case, the visible light transmittance ($LT_A$) drastically decreases and the production cost increases according to the increase in the use amount of Se and $Cr_2O_3$. The CoO content is more preferably 0.02 to 0.03 part by weight, and still more preferably 0.023 to 0.028 part by weight, based on 100 parts by weight of the base glass composition in order to effectively suppress the visible light transmittance ($LT_A$) and adjust the blue color in a balanced way.

Selenium (Se)

Selenium (Se) shows different coloring behaviors according to its state of oxidation/reduction in glass. When it exists as a Se element and in a combination form of Fe—Se, it shows absorption edge at 480 to 500 nm. In this case, it is known to colorize the glass to red-brown.

The glass composition of the present invention comprises Se in an amount of 0.002 to 0.0035 part by weight, based on 100 parts by weight of the base glass composition. Specifically, the amount of Se may be, for example, 0.0022, 0.0023, 0.0024, 0.0025 or 0.0026 or more part by weight, or 0.0033, 0.0032, 0.0031 or 0.003 or less part by weight.

If the amount of Se is less than 0.002 part by weight, based on 100 parts by weight of the base glass composition, the glass has a strong blue or green color tone. If its amount is greater than 0.0035 part by weight, based on 100 parts by weight of the base glass composition, the glass has a bronze-like color. Accordingly, in both cases of being out of the above range, it becomes difficult to maintain the visible light transmittance ($LT_A$) having the function of privacy protection and visibility at the same time. The Se content is more preferably 0.0022 to 0.0033 part by weight, and still more preferably 0.0025 to 0.003 part by weight, based on 100 parts by weight of the base glass composition in order to maintain color and privacy protection.

Chromium ($Cr_2O_3$)

Chromium (Cr) is fed to a batch in the form of chromium oxide. When existing in $Cr^{3+}$ form, it shows absorption edge at around 450 and 650 nm. By the effect of such absorption, chromium forms green-colored glass composition and decreases the visible light transmittance ($LT_A$) to satisfy privacy protection function. Green color has the advantages of relieving eye strain of the viewer, providing psychological stability to the viewer and easily matching with surrounding colors.

The glass composition of the present invention comprises $Cr_2O_3$ in an amount of 0.01 to 0.04 part by weight, based on 100 parts by weight of the base glass composition. Specifically, the amount of $Cr_2O_3$ may be, for example, 0.015, 0.016, 0.017, 0.018, 0.019 or 0.02 or more part by weight, or 0.03, 0.028, 0.027, 0.026, 0.025, 0.024 or 0.023 or less part by weight.

If the amount of $Cr_2O_3$ is less than 0.01 part by weight, based on 100 parts by weight of the base glass composition, there is a limitation in forming dark, green-gray colored glass composition, and the visible light transmittance ($LT_A$) increases. If the amount of $Cr_2O_3$ is greater than 0.04 part by weight, based on 100 parts by weight of the base glass composition, the visible light transmittance is lowered, but it is necessary to increase the amounts of Se and CoO corresponding to the increase of color purity due to the adsorption edge of $Cr_2O_3$ itself, and in this case, the visible light transmittance ($LT_A$) drastically decreases and the production cost increases according to the increase of the use amount of Se and CoO. The $Cr_2O_3$ content is more preferably 0.015 to 0.03 part by weight, and still more preferably 0.018 to 0.023 part by weight, based on 100 parts by weight of the base glass composition in order to prepare a low transmission glass composition having dark, green-gray color and low visible light transmittance at the same time.

Weight Ratio of ($CoO+Cr_2O_3$) to Se (=[$CoO+Cr_2O_3$]/Se)

With respect to the contents of colorant ingredients, CoO, Se and $Cr_2O_3$ as explained above, the weight ratio of ($CoO+Cr_2O_3$) to Se (=[$CoO+Cr_2O_3$]/Se) in the glass composition of the present invention is in the range of 13 to 25, more preferably the range of 13 to 20, and still more preferably the range of 13 to 17.

If the weight ratio of ($CoO+Cr_2O_3$)/Se is less than 13, a colored glass composition having strong red-brown color is formed. If the weight ratio is greater than 25, a colored glass composition having strong blue-green color is formed.

Se forms a colored glass composition having strong red-brown color, and is very excellent in terms of coloring effect so that its suppression is necessary. In the present invention, the blue-green colorant ingredients combination ($CoO+Cr_2O_3$), which corresponds to a complementary color of red-brown color, is used in the above ratio to Se so that a dark, green-gray color can be colorized. That is, if the weight ratio of ($CoO+Cr_2O_3$)/Se is less than or greater than the above range, there is a limitation in preparing a dark, green-gray colored glass having the range of the desired color space coordinate of transparent color, L*=35 to 50, a*=−5 to 0 and b*=0 to 6.

Weight Ratio of CoO to $Cr_2O_3$ (=$CoO/Cr_2O_3$)

In addition, with respect to the contents of colorant ingredients, CoO and $Cr_2O_3$ as explained above, the weight ratio of CoO to $Cr_2O_3$ (=$CoO/Cr_2O_3$) in the glass composition of the present invention is in the range of 0.9 to 1.8, more preferably the range of 1 to 1.8, and still more preferably the range of 1 to 1.6.

If the weight ratio of $CoO/Cr_2O_3$ is less than 0.9, a colored glass composition having strong green color is formed. If the weight ratio is greater than 1.8, a colored glass composition having strong blue color is formed.

In the present invention, a suitable blue-green color, which corresponds to a complementary color of red-brown color, can be colorized by the use of blue and green colorant ingredients, CoO and $Cr_2O_3$, respectively, in the above ratio. That is, if the weight ratio of $CoO/Cr_2O_3$ is less than or greater than the above range, there is also a limitation in preparing a dark, green-gray colored glass having the range of the desired color space coordinate of transparent color, L*=35 to 50, a*=−5 to 0 and b*=0 to 6.

Other Optional Ingredients

In addition to the colorant ingredients as explained above, the glass composition of the present invention may further comprise other optional ingredient(s) within the range of achieving the purpose thereof.

For example, manganese oxide ($MnO_2$) may be selectively used in the composition of the present invention for decolorization of green coloring of $Fe_2O_3$ and $Cr_2O_3$. In this case, the addition amount of $MnO_2$ may be 0.1 or less part by weight, based on 100 parts by weight of the base glass composition.

In addition, the glass composition of the present invention may further comprise, as additional colorant ingredient, an oxide of rare-earth element selected from lanthanides consisting of Ce, Sc, Y, La, Pr, Nd, Pm, Sm, Eu, Gd, Tb, Dy, Ho, Er, Tm, Yb and Lu—for example, cerium oxide ($CeO_2$). In this case, the addition amount of $CeO_2$ may be 0.1 or less part by weight, based on 100 parts by weight of the base glass composition.

There is no special limitation in the method for preparing the dark, green-gray colored, low-transmittance glass composition of the present invention from the above-explained ingredients, and a general method in this field of art may be used for its preparation. For example, the preparation may be carried out by melting a raw material batch of ingredients and amounts according to the present invention at high temperature and then rapidly cooling them to obtain a glass powder.

In a preferred embodiment, the dark, green-gray colored, low-transmittance glass composition of the present invention has a visible light transmittance ($LT_A$) of 15% or less (for example, 0.1 to 15%, more preferably 14% or less, still more preferably 13% or less, still more preferably 10% or less, and still more preferably 8% or less), a solar energy transmittance ($T_e$) of 16% or less (for example, 0.1 to 16%, more preferably 15% or less, still more preferably 14% or less, still more preferably 10% or less, and still more preferably 7% or less) and an ultraviolet rays transmittance ($T_{uv}$) of 5% or less (for example, 0.1 to 5%, more preferably 3% or less, still more preferably 2% or less, and still more preferably 1% or less), measured for a reference thickness of 4 mm.

If the visible light transmittance ($LT_A$) becomes greater than 15%, there may be a limitation in application for privacy protection, and it may be specifically problematic in applying the glass as sun roof and privacy glass among safety glasses for motor vehicles where the protection of privacy is particularly important. If the solar energy transmittance ($T_e$) becomes greater than 16%, there may be a problem of increasing cooling load due to the increase of heat absorption into the interior of motor vehicles, buildings, etc. In the case of ultraviolet rays, because it causes aging of interior materials and skin aging of the human body, it is preferable that the ultraviolet rays transmittance ($T_{uv}$) is managed to less than 5%, measured for a reference thickness of 4 mm.

In addition, the dark, green-gray colored, low-transmittance glass composition of the present invention preferably has the range of 35 to 50 of L*, −5 to 0 of a* and 0 to 6 of b* at color space coordinate of transparent color.

To properly be used as windows of motor vehicles and buildings, it is preferable that the color space coordinate of transparent color of glass be within the above range. If the glass color is out of the above range, red-brown color, blue color or green color becomes strong, resulting in causing eye strain and damaging psychological stability.

There is no special limitation in the use of the dark, green-gray colored, low-transmittance glass composition of the present invention, and, for example, it may be used for windows (side, rear, sun roof) of vehicles such as motor vehicles, windows of buildings, ornaments or furniture. It is particularly suitable as car safety glass, and also suitable for window glass for buildings. As car safety glass, it may be applicable to sun roof, or side or rear privacy glass, but is not limited thereto.

The present invention is explained in more detail by the following Examples. However, these Examples seek to illustrate the present invention only, and the scope of the present invention is not limited thereby.

EXAMPLES 1 TO 6 AND COMPARATIVE EXAMPLES 1 TO 6

By using silica, limestone, dolomite, soda ash, sodium sulfate, iron oxide, cobalt oxide, selenium, chromium, cokes, etc. as the raw materials, the glass compositions of the Examples and Comparative Examples were prepared. The ingredients and amounts in the prepared base glass are represented in the following Table 2, and the colorant ingredients and amounts (part by weight based on 100 parts by weight of the base glass) used in the Examples and Comparative Examples are represented in the following Table 3 (Examples 1 to 6) and Table 4 (Comparative Examples 1 to 6).

The sample glasses for the chemical analysis and optical characteristics evaluation of the glass compositions were prepared by using a Pt-10% Rh crucible in an electric furnace. The raw material batch as weighed on a 200 g basis was melted at 1,450° C. for 1 hour and 30 minutes, and subjected to rapid cooling to obtain glass powder. One-hour melting at 1,450° C. was then repeated two times to prepare a sample with high homogeneity. After casting-molding of the prepared sample glasses with an SUS plate and processing to a thickness of 4 mm, the properties were evaluated.

The chemical composition analysis of the sample glasses was conducted by using 3370 X-ray fluorescence analyzer (XRF) of Rigaku Corporation, and optical characteristics were measured as follows:

Visible light transmittance ($LT_A$): Measured at a wavelength range of 370 to 770 nm with light source CIE A, 2 degree angle of view Solar energy transmittance ($T_e$): Measured at a wavelength range of 300 to 2,500 nm according to ISO 9050:2003

Ultraviolet rays transmittance ($T_{uv}$): Measured at a wavelength range of 300 to 380 nm according to ISO 9050:2003.

Color space coordinate L*, a*, b*: Measured with light source D65, 10 degree angle of view The above transmittance was measured by the use of Lambda 950 spectrophotometer (PerkinElmer Inc.), and the above color space coordinate was measured by the use of a HUNTER LAB colorimeter. The measured results are represented in the following Tables 3 and 4.

TABLE 2

| Base glass composition (% by weight) | |
|---|---|
| $SiO_2$ | 71.2 |
| $Al_2O_3$ | 0.95 |
| CaO | 9.8 |
| MgO | 3.8 |
| $Na_2O$ | 13.9 |
| $K_2O$ | 0.15 |
| $SO_3$ | 0.2 |

TABLE 3

(Colorant content: based on 100 parts by weight of the base glass)

| Item | Ingredient | Example 1 | Example 2 | Example 3 | Example 4 | Example 5 | Example 6 |
|---|---|---|---|---|---|---|---|
| Colorant I | Total $Fe_2O_3$ | 1.29 | 1.41 | 1.68 | 1.74 | 1.55 | 1.38 |
| Colorant II | CoO | 0.0244 | 0.0248 | 0.0262 | 0.0282 | 0.0222 | 0.0256 |
|  | Se | 0.0028 | 0.0028 | 0.0031 | 0.0033 | 0.0025 | 0.0023 |
|  | $Cr_2O_3$ | 0.0202 | 0.0211 | 0.016 | 0.0273 | 0.0192 | 0.0255 |
| (CoO + $Cr_2O_3$)/Se | | 15.9 | 16.5 | 13.8 | 16.9 | 16.9 | 16.9 |
| CoO/$Cr_2O_3$ | | 1.2 | 1.2 | 1.6 | 1.0 | 1.2 | 1.2 |

TABLE 3-continued (Colorant content: based on 100 parts by weight of the base glass)

| Item | Ingredient | Example 1 | Example 2 | Example 3 | Example 4 | Example 5 | Example 6 |
|---|---|---|---|---|---|---|---|
| FeO/Total $Fe_2O_3$ | | 0.24 | 0.23 | 0.26 | 0.24 | 0.25 | 0.24 |
| Optical | $LT_A$ | 13.7 | 12.9 | 9.7 | 7.2 | 14.7 | 13.5 |
| properties | $T_e$ | 14.9 | 13.6 | 5.9 | 6.5 | 9.2 | 13.3 |
| | $T_{uv}$ | 2.9 | 1.7 | 1.0 | 0.2 | 1.4 | 3.0 |
| Color | $L^*$ | 43.5 | 42.6 | 38.7 | 35.5 | 45.0 | 43.8 |
| | $a^*$ | −2.0 | −2.8 | −3.9 | −4.2 | −4.9 | −4.7 |
| | $b^*$ | 2.5 | 3.3 | 2.7 | 4.5 | 4.0 | 0.3 |

TABLE 4

(Colorant content: based on 100 parts by weight of the base glass)

| Item | Ingredient | Comp. Exam. 1 | Comp. Exam. 2 | Comp. Exam. 3 | Comp. Exam. 4 | Comp. Exam. 5 | Comp. Exam. 6 |
|---|---|---|---|---|---|---|---|
| Colorant I | Total $Fe_2O_3$ | 1.28 | 1.43 | 1.65 | 1.72 | 1.05 | 2.26 |
| Colorant II | CoO | 0.0244 | 0.0297 | 0.0221 | 0.0298 | 0.0243 | 0.028 |
| | Se | 0.0025 | 0.0029 | 0.0031 | 0.0022 | 0.0029 | 0.0033 |
| | $Cr_2O_3$ | 0 | 0.0152 | 0.0282 | 0.0289 | 0.0205 | 0.027 |
| $(CoO + Cr_2O_3)/Se$ | | 9.6 | 15.5 | 16.1 | 26.4 | 15.4 | 16.9 |
| $CoO/Cr_2O_3$ | | — | 2.0 | 0.8 | 1.0 | 1.2 | 1.0 |
| FeO/Total $Fe_2O_3$ | | 0.24 | 0.23 | 0.26 | 0.24 | 0.21 | 0.24 |
| Optical | $LT_A$ | 16.4 | 9.6 | 11.8 | 9.1 | 17.1 | 4.7 |
| properties | $T_e$ | 16.3 | 13.2 | 6.4 | 6.9 | 22.1 | 3.2 |
| | $T_{uv}$ | 4.5 | 1.3 | 1.7 | 0.1 | 5.4 | 0.2 |
| Color | $L^*$ | 45.9 | 38.8 | 40.8 | 38.9 | 44.9 | 32.5 |
| | $a^*$ | −1.5 | −2.6 | −3.9 | −8.1 | 0.4 | −7.8 |
| | $b^*$ | −1.5 | −1.8 | 8.7 | −2.1 | 3.1 | 7.7 |

As can be seen from the above Table 3, the glasses of Examples 1 to 6 satisfied dark, green-gray color at color space coordinate of transparent color L*, a*, b*, and also showed excellent low-transmittance property at visible light transmittance ($LT_A$), solar energy transmittance ($T_e$) and ultraviolet rays transmittance ($T_{uv}$), so that they are suitable for use as sun roof, and side and rear privacy window of motor vehicles.

On the other hand, in Comparative Example 1 visible light transmittance ($LT_A$) and solar energy transmittance ($T_e$) were too high to form a low-transmittance glass composition desired in the present invention. In addition, by the effect of strong blue coloring, color space coordinate of transparent color b* was less than the range for dark, green-gray color, so that the dark, green-gray colored glass composition could not be formed.

In Comparative Example 2, by the effect of strong blue coloring, color space coordinate of transparent color b* was less than the range for dark, green-gray color, so that the dark, green-gray colored glass composition could not be formed.

In Comparative Example 3, by the effect of strong green coloring, color space coordinate of transparent color b* was greater than the range for dark, green-gray color, so that the dark, green-gray colored glass composition could not be formed.

In Comparative Example 4, by the effect of strong blue-green coloring, color space coordinate of transparent color a* and b* were less than the range for dark, green-gray color, so that the dark, green-gray colored glass composition could not be formed.

In Comparative Example 5, all of visible light transmittance ($LT_A$), solar energy transmittance ($T_e$) and ultraviolet rays transmittance ($T_{uv}$) were too high to form a low-transmittance glass composition desired in the present invention. In addition, color space coordinate of transparent color a* was greater than the range for dark, green-gray color, so that the dark, green-gray colored glass composition could not be formed.

In Comparative Example 6, all of color space coordinate of transparent color L*, a* and b* were out of the range for dark, green-gray color, so that the dark, green-gray colored glass composition could not be formed.

The invention claimed is:

1. A dark, green-gray colored, low-transmittance glass composition which comprises:
   as colorant ingredients, 1.2 to 2 parts by weight of total $Fe_2O_3$, 0.0220 to 0.04 part by weight of CoO, 0.002 to 0.0035 part by weight of Se and 0.01 to 0.04 part by weight of $Cr_2O_3$, based on 100 parts by weight of a base glass composition,
   wherein the weight ratio of $(CoO+Cr_2O_3)$ to Se $(=[CoO+Cr_2O_3]/Se)$ is 13 to 25, and the weight ratio of CoO to $Cr_2O_3$ $(=CoO/Cr_2O_3)$ is 0.9 to 1.8, and which shows a visible light transmittance (LTA) of 15% or less, a solar energy transmittance (Te) of 16% or less, and an ultraviolet rays transmittance (Tuv) of 3% or less, measured for a reference thickness of 4 mm.

2. The dark, green-gray colored, low-transmittance glass composition according to claim 1, wherein the base glass composition comprises 65 to 75% by weight of $SiO_2$, 0.3 to 3.0% by weight of $Al_2O_3$, 10 to 18% by weight of $Na_2O+K_2O$, 5 to 15% by weight of CaO and 1 to 7% by weight of MgO, based on total 100% by weight of the base glass composition.

3. The dark, green-gray colored, low-transmittance glass composition according to claim 1, wherein the FeO content in the composition is 10 to 30% of the total $Fe_2O_3$ content.

4. The dark, green-gray colored, low-transmittance glass composition according to claim 1, which has a color space coordinate of transparent color with L* of 35 to 50, a* of −5 to 0 and b* of 0 to 6.

5. The dark, green-gray colored, low-transmittance glass composition according to claim 1, which further comprises $MnO_2$.

6. The dark, green-gray colored, low-transmittance glass composition according to claim 5, which has a color space coordinate of transparent color with L* of 35 to 50, a* of −5 to 0 and b* of 0 to 6.

7. The dark, green-gray colored, low-transmittance glass composition according to claim 1, which further comprises an oxide of rare-earth element selected from lanthanides consisting of Ce, Sc, Y, La, Pr, Nd, Pm, Sm, Eu, Gd, Tb, Dy, Ho, Er, Tm, Yb and Lu.

8. The dark, green-gray colored, low-transmittance glass composition according to claim 7, which has a color space coordinate of transparent color with L* of 35 to 50, a* of −5 to 0 and b* of 0 to 6.

\* \* \* \* \*

UNITED STATES PATENT AND TRADEMARK OFFICE
CERTIFICATE OF CORRECTION

PATENT NO. : 9,617,182 B2
APPLICATION NO. : 14/759587
DATED : April 11, 2017
INVENTOR(S) : Youn Min Cho et al.

Page 1 of 1

It is certified that error appears in the above-identified patent and that said Letters Patent is hereby corrected as shown below:

On the Title Page

(73) Assignee: Delete "KKC Corporation" and insert --KCC Corporation--.

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*